(12) United States Patent
Ogimura

(10) Patent No.: US 9,862,217 B2
(45) Date of Patent: Jan. 9, 2018

(54) PRINTING APPARATUS

(71) Applicant: SEIKO EPSON CORPORATION, Tokyo (JP)

(72) Inventor: Takafumi Ogimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/451,954

(22) Filed: Mar. 7, 2017

(65) Prior Publication Data

US 2017/0282617 A1 Oct. 5, 2017

(30) Foreign Application Priority Data

Apr. 5, 2016 (JP) ................................. 2016-075619

(51) Int. Cl.
| | | |
|---|---|---|
| H04N 1/00 | (2006.01) | |
| H04N 1/387 | (2006.01) | |
| B41J 29/38 | (2006.01) | |
| H04N 1/23 | (2006.01) | |
| H04N 1/405 | (2006.01) | |

(52) U.S. Cl.
CPC .......... *B41J 29/38* (2013.01); *H04N 1/00575* (2013.01); *H04N 1/2338* (2013.01); *H04N 1/405* (2013.01); *H04N 2201/0094* (2013.01)

(58) Field of Classification Search
CPC ....... B41J 3/60; B41J 5/30; B41J 13/00; B41J 29/38; H04N 1/00575; H04N 1/2338; H04N 1/405; H04N 1/387
See application file for complete search history.

(56) References Cited

U.S. PATENT DOCUMENTS

| | | | | | |
|---|---|---|---|---|---|
| 5,889,595 | A | * | 3/1999 | Kim | ........................... B41J 2/36 347/14 |
| 7,643,187 | B2 | * | 1/2010 | Tagawa | .............. G03G 15/6541 358/1.14 |
| 8,121,510 | B2 | * | 2/2012 | Roppongi | .................. B41J 3/60 271/184 |
| 8,358,426 | B2 | * | 1/2013 | Morishita | .............. B41J 2/1652 358/1.12 |

FOREIGN PATENT DOCUMENTS

JP 2001-353911 A 12/2001

* cited by examiner

*Primary Examiner* — Anh T. N. Vo
(74) *Attorney, Agent, or Firm* — Global IP Counselors, LLP

(57) ABSTRACT

A printing apparatus that is capable of executing, based on printing data, printing onto a first side of a printing medium and printing onto a second side, which is the back side of the first side, after the printing onto the first side is provided. A print density of a predetermined region at a rear end of the printing medium in a transporting direction at a time of printing of the first side is identified based on the printing data. Conversion data, which is a conversion coefficient to make the identified print density equal to or lower than a predetermined density, is acquired. The printing data is converted by means of the conversion data. Printing onto the first side is executed based on the converted printing data.

7 Claims, 11 Drawing Sheets

| PRINT DENSITY X | DRYING TIME T |
|---|---|
| 0 ≤ X ≤ X1 | T1 (sec) |
| X1 < X ≤ X2 | T2 (sec) |
| X2 < X ≤ X3 | T3 (sec) |
| ⋮ | ⋮ |

FIG. 11

| PRINTING DENSITY DIFFERENCE Z | DRYING TIME T |
|---|---|
| $0 \leq Z \leq Z1$ | T4 (sec) |
| $Z1 < Z \leq Z2$ | T5 (sec) |
| $Z2 < Z \leq Z3$ | T6 (sec) |
| ⋮ | ⋮ |

51

PRINTING APPARATUS

CROSS REFERENCES TO RELATED APPLICATIONS

The entire disclosure of Japanese Patent Application No. 2016-075619, filed Apr. 5, 2016 is expressly incorporated by reference herein.

BACKGROUND

1. Technical Field

The present invention relates to a printing apparatus.

2. Related Art

In the field of a printer, a product capable of executing double-sided printing that is performing printing on the front side of paper and then inverting the paper to perform printing on the back side of the paper is known.

In addition, a double-sided recording method in which duty of an image to be recorded on the sheet is limited to be lower than a normal recording mode is known as a form of recording onto a sheet in a double-sided recording mode (refer to JP-A-2001-353911).

At a time of executing double-sided printing, the paper swells out and bends (curls) in some cases due to the moisture of inks when the inks are discharged on the front side of the paper. When printing is executed onto the back side of the paper which is in such a curled state, a part of the paper comes too close to a print head for discharging inks or comes into contact with the print head. Thus, print quality may be lowered or the paper may become dirty. In addition, when the paper in the curled state is transported, a transporting error including a paper jam may occur. For this reason, the curl of the paper can be straightened in the process of transporting the paper to invert the paper for printing onto the back side after printing onto the front side by temporarily stopping the transporting and providing drying time of the paper.

Herein, among printer users, there are users who put emphasis on printing efficiency. Such users do not want time taken until double-sided printing is terminated to become longer due to drying time. However, since the drying time is needed to straighten the curl, reducing the drying time needs a scheme to ensure that an adverse effect caused by this reduction does not occur.

SUMMARY

An advantage of some aspects of the invention is to provide a printing apparatus which contributes to improving printing efficiency.

According to an aspect of the invention, there is provided a printing apparatus that is capable of executing, based on printing data, printing onto a first side of a printing medium and printing onto a second side, which is the back side of the first side, after the printing onto the first side. A print density of a predetermined region at a rear end of the first side is identified based on the printing data. Conversion data, which makes the identified print density equal to or lower than a predetermined density, is acquired. The printing data is converted by means of the conversion data. Printing is executed based on the converted printing data.

According to this configuration, printing is executed based on the printing data obtained by lowering the density as a whole by going through conversion by means of the conversion data which is based on the print density of the predetermined region at the rear end of the first side and the predetermined density. Accordingly, the drying time after the printing onto the first side can be reduced and total time required for double-sided printing shortens in the end. In other words, printing efficiency improves.

According to the aspect of the invention, in the printing apparatus, receiving designation of a high-speed printing mode, in which a printing speed takes precedence, out of a plurality of printing modes is possible. The printing apparatus may execute the printing based on the converted printing data in a case where the designation of the high-speed printing mode is received and execute the printing based on the printing data before the conversion in a case where the designation of the high-speed printing mode is not received.

According to this configuration, in a case where the user designates the high-speed printing mode, printing is executed based on the printing data obtained by going through the conversion and lowering the density as a whole. Accordingly, a user's demand for performing high-speed printing, in other words, finishing printing in a short period of time can be precisely met.

According to the aspect of the invention, the predetermined density may be a print density that does not need drying time of the printing medium provided before the printing onto the second side is started, which is after the printing onto the first side.

According to this configuration, since the converted printing data is data indicating a density to an extent that the drying time after the printing onto the first side is not needed, the drying time is practically 0 and printing efficiency improves.

According to the aspect of the invention, the printing apparatus may identify the highest print density out of print densities of split regions in a case where the predetermined region is split into a plurality of regions and acquire conversion data to make the highest print density equal to or lower than the predetermined density.

According to this configuration, even if there is a region with a locally high density in the predetermined region, the conversion data to make the print density of such a region equal to or lower than the predetermined density is obtained. Accordingly, the generation of curl to an extent that the drying time is needed in the vicinity of the rear end after the printing onto the first side can be avoided.

According to the aspect of the invention, the printing apparatus may weight the print densities of the split regions such that a higher weight is given to print densities of split regions farther from the center of the printing medium and identify the highest print density out of the weighted print densities of the split regions.

According to this configuration, the print density of a split region, which is at a position where curl is likely to be generated, is easily identified as the highest print density when obtaining the conversion data and, consequently, the generation of curl to an extent that the drying time is needed in the vicinity of the rear end after the printing onto the first side can be precisely avoided.

According to another aspect of the invention, there is provided a printing apparatus that is capable of executing, based on printing data, printing onto a first side of a printing medium and printing onto a second side, which is the back side of the first side, after the printing onto the first side. A print density difference within a predetermined region at a rear end of the first side is identified based on the printing data. Conversion data, which makes the identified print density difference equal to or lower than a predetermined density difference, is acquired. The printing data is converted by means of the conversion data. Printing is executed based on the converted printing data.

According to this configuration, printing is executed based on the printing data obtained by lowering the density and the density difference as a whole by going through conversion by means of the conversion data which is based on the print density difference of the predetermined region at the rear end of the first side and the predetermined density difference. Accordingly, the drying time after the printing onto the first side can be reduced and total time required for double-sided printing shortens in the end. In other words, printing efficiency improves.

The technical ideas of the invention may be realized by an apparatus other than the printing apparatus. For example, a method (printing method) including processes executed by the printing apparatus can be perceived as an invention. In addition, a program that causes a computer to execute such a method and a storage medium capable of reading the program stored in the computer may be respectively established as inventions.

BRIEF DESCRIPTION OF THE DRAWINGS

The invention will be described with reference to the accompanying drawings, wherein like numbers reference like elements.

FIG. 6 is a view illustrating an example of a drying time table.

FIG. 11 is a view illustrating another example of the drying time table.

DESCRIPTION OF EXEMPLARY EMBODIMENTS

Hereinafter, an embodiment of the invention will be described with reference to each drawing. Each drawing is merely an example for describing the embodiment. In addition, in some cases, each drawing is not consistent in terms of shape or dimensions.

1. Rough Description of Apparatus

Figure 1:
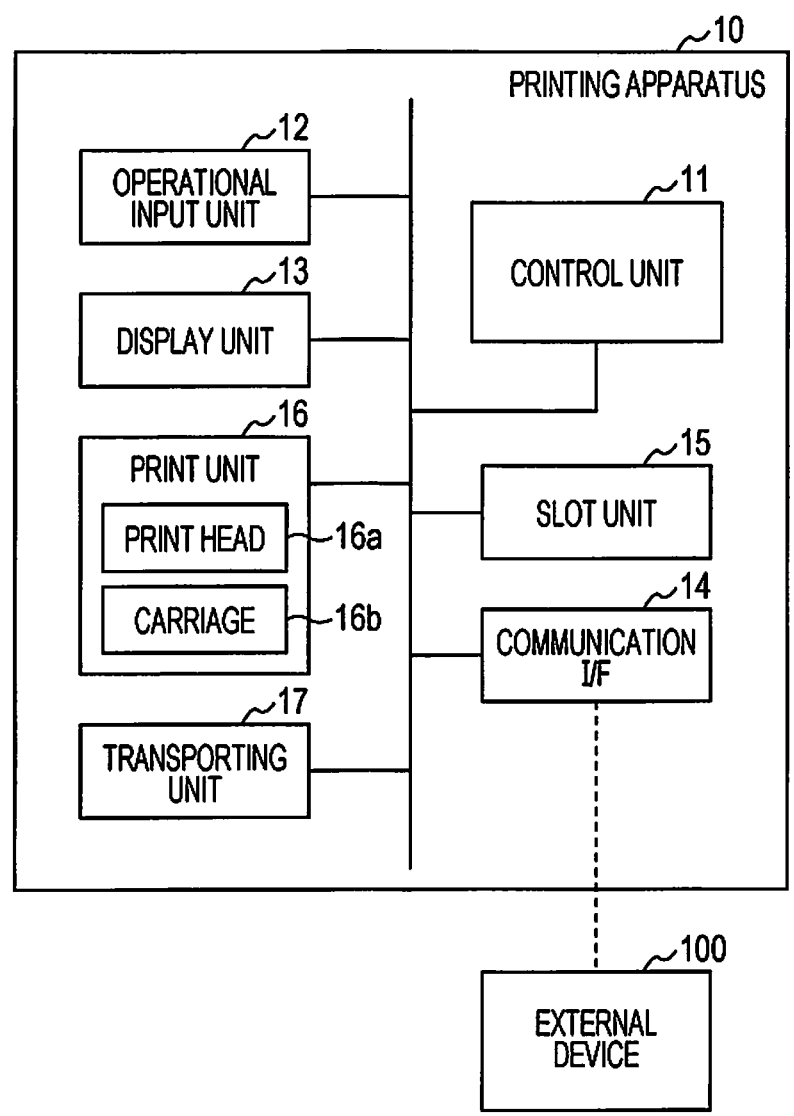
FIG. 1 is a block diagram illustrating a configuration of a printing apparatus.

FIG. 1 is a block diagram illustrating a configuration of a printing apparatus 10 according to the embodiment. The printing apparatus 10 is capable of executing printing onto a first side of a printing medium and printing onto a second side, which is the back side of the first side after the printing onto the first side, that is, is capable of executing double-sided printing based on printing data indicating an image. The printing apparatus 10 is, for example, a product such as a printer and a multifunction printer having a plurality of functions of a printer, a scanner, and a facsimile. The printing apparatus may be called as a recording apparatus, a liquid discharging (ejecting) apparatus, and the like. In addition, all or a part of the printing apparatus may be called as a printing control device or the like. In FIG. 1, the printing apparatus 10 is illustrated to have a configuration in which a control unit 11, an operational input unit 12, a display unit 13, a communication interface (I/F) 14, a slot unit 15, a print unit 16, a transporting unit 17, and the like are included.

The control unit 11 is configured of, for example, an IC having a CPU, a ROM, a RAM, and the like or other storage medium. In the control unit 11, the CPU controls operation of each configuration of the printing apparatus 10 by executing arithmetic processing in accordance with a program saved in the ROM or the like with the RAM or the like being used as a work area.

The operational input unit 12 includes various buttons and keys for receiving operation by a user. The display unit 13 is a part for showing various types of information related to the printing apparatus 10 and is configured of, for example, a liquid crystal display (LCD). A part of the operational input unit 12 may be realized as a touch panel displayed on the display unit 13.

The print unit 16 is a mechanism for printing an image onto the printing medium (paper) under the control of the control unit 11. Although the printing medium will be described as paper in the embodiment, a printing medium made of a material other than paper is not excluded from being used. In a case where a printing system adopted for the print unit 16 is an ink jet system, the print unit 16 has a configuration where a print head 16a, which has a plurality of nozzles and discharges a liquid (ink) from the nozzles, and a carriage 16b, on which the print head 16a is loaded and which moves in a predetermined main scanning direction, are provided. The print head may be called as a typing head, a recording head, a liquid discharging (ejecting) head, and the like. Although not illustrated, the print head 16a receives supply of the ink from an ink cartridge or the like holding the ink and discharges the supplied ink from each nozzle. By the ink discharged from each nozzle landing on the paper, ink dots are formed on the paper.

The transporting unit 17 transports the paper under the control of the control unit 11. The transporting unit 17 includes rollers (for example, each of rollers 23, 24, 25, and 26 illustrated in FIGS. 2A to 2C) that rotate to transport the paper onto a predetermined transport path, a motor that produces power to rotate the rollers, and a gear wheel train for transmitting the power produced by the motor to the rollers. The print head 16a performs printing by discharging the ink onto the paper transported through the transport path by the transporting unit 17. The print head 16a discharges a variety of types of inks. For example, the print head 16a discharges a plurality of colors of inks including cyan (C), magenta (M), yellow (Y), and black (K).

The communication I/F 14 is a generic term for an interface for connecting the printing apparatus 10 to an external device 100 in a wired or a wireless manner. A variety of devices, for example, a smartphone, a tablet terminal, a digital still camera, and a personal computer (PC), which are sources of input of information needed for the printing apparatus 10 to print, may be the external device 100. The printing apparatus 10 can be connected to the external device 100 via the communication I/F 14 by means of, for example, a variety of types of means or communication standards including a USB cable, a wired network, a wireless LAN, and an electronic mail communication. The slot unit 15 is a part for inserting an external storage medium including a memory card. In other words, in the printing apparatus 10, the information needed for printing can be input from the external storage medium, including a memory card inserted in the slot unit 15.

Figure 2A:
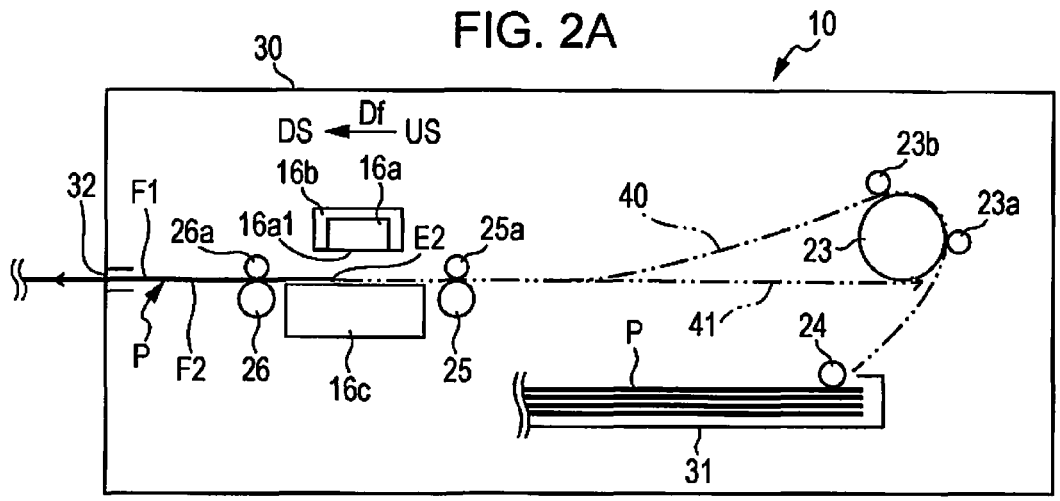
FIGS. 2A to 2C are views simply illustrating a configuration regarding transporting of paper and changes in the position of the paper.
Figure 2B:
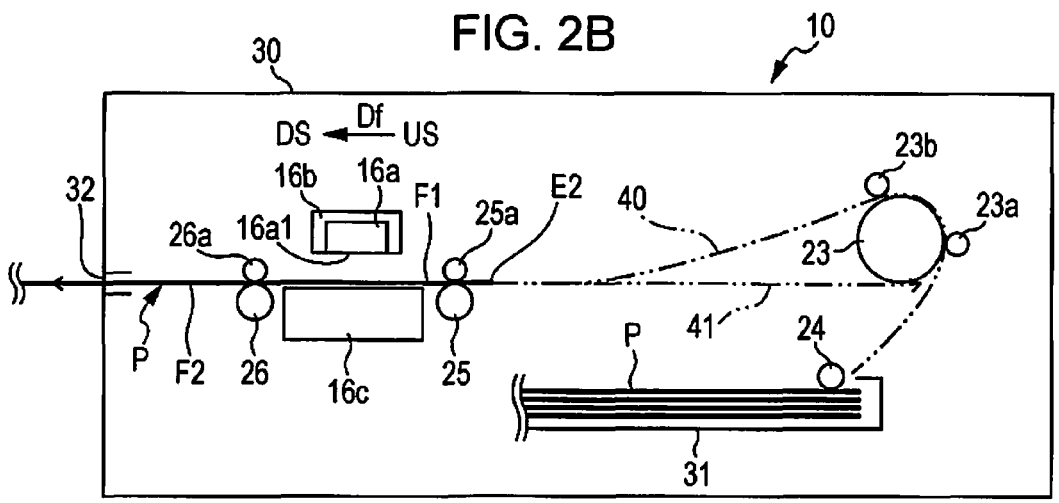
Figure 2C:
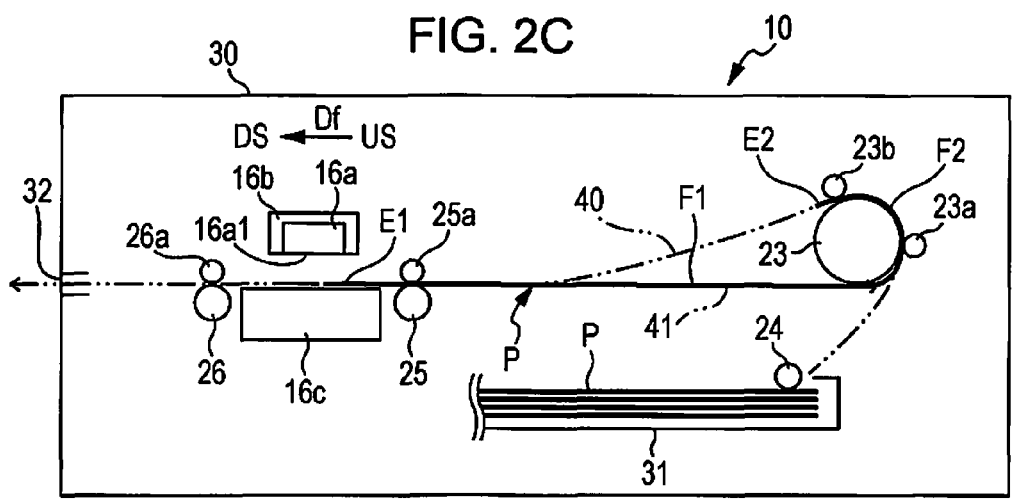

FIGS. 2A to 2C simply illustrate a configuration mainly regarding transporting of paper P within the printing apparatus 10 from a viewpoint of facing the main scanning direction of the carriage 16b. A reference sign Df indicates a transporting direction in which the transporting unit 17 transports the paper P. The transporting direction Df is basically orthogonal to the main scanning direction. In FIGS. 2A to 2C, the main scanning direction is a direction perpendicular to the drawing. The transporting unit 17 changes the position of the paper P, which is a transporting target, as illustrated in FIGS. 2A to 2C. The printing apparatus 10 has, for example, a paper feed cassette 31 that is capable of accommodating a plurality of sheets of paper P and an output port 32 through which the paper P is output to the outside of a housing 30 of the printing apparatus 10. In an example of FIGS. 2A to 2C, the paper feed cassette 31 is accommodated in a lower portion of the housing 30. It is needless to say that the user can mount the paper feed cassette 31 in the housing 30, or can draw the paper feed cassette 31 out from the housing 30.

The printing apparatus 10 is provided with a transport path 40 running from the paper feed cassette 31, which is a source of supply, to the output port 32, and a transport path for inversion 41 that links predetermined two points on the transport path 40, as respectively shown by two-dot chain line arrows in FIGS. 2A to 2C. The paper feed cassette 31 is the most upstream side of the transport path 40. The output port 32 is the most downstream side of the transport path 40. In the vicinity of the paper feed cassette 31, the pick-up (PU) roller 24 is provided. The PU roller 24 sends the paper P one by one from the paper feed cassette 31 onto the transport path 40 by coming into contact with the upper most paper P accommodated in the paper feed cassette 31. Corresponding to the transport path 40, the intermediate roller 23 and the following rollers 23a and 23b, which respectively oppose the intermediate roller 23, are provided. In a state of being pinched between the intermediate roller 23 and the following roller 23a and/or being pinched between the intermediate roller 23 and the following roller 23b, the paper P transported from the paper feed cassette 31 is transported to the downstream side through the transport path 40 in response to the rotation of the intermediate roller 23.

Corresponding to the transport path 40, the transporting (PF) roller 25 and the output (EJ) roller 26 are provided on the downstream side of the intermediate roller 23. Specifically, a part of the transport path 40 is a platen 16c. The PF roller 25 and a following roller 25a opposing the and the PF roller 25 are provided on an upstream side US of the platen 16c in the transporting direction Df. The EJ roller 26 and a following roller 26a opposing the EJ roller 26 are provided on a downstream side DS of the platen 16c in the transporting direction Df. The print head 16a is provided so as to oppose the platen 16c at a position above the platen 16c. The print head 16a is moved by the carriage 16b in the main scanning direction in a state where a nozzle surface 16a1, which is a surface to which each nozzle is opened, faces the platen 16c.

In a state of being pinched between the PF roller 25 and the following roller 25a and/or being pinched between the EJ roller 26 and the following roller 26a in due time, the paper P transported through the transport path 40 in response to the rotation of the intermediate roller 23 is transported to the downstream side DS in response to rotation (forward rotation) of the rollers 25 and 26. The paper P is intermittently transported (paper fed) in a period when the paper P passes under the nozzle surface 16a1. In other words, inks are discharged to a surface of the paper P opposing the nozzle surface 16a1 on the platen 16c by alternately repeating transporting of the paper P from the upstream side US to the downstream side DS over a predetermined distance and ink discharging (also referred to as a pass of the print head 16a) performed by the print head 16a accompanying the movement of the carriage 16b in the main scanning direction.

Figure 3A:
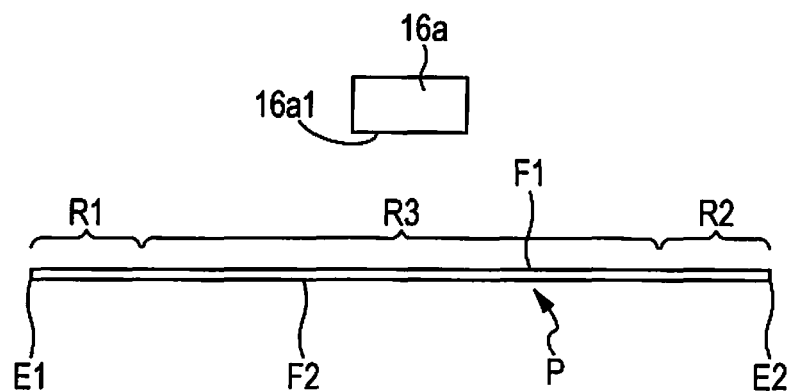
FIGS. 3A and 3B are views illustrating details of the paper.
Figure 3B:
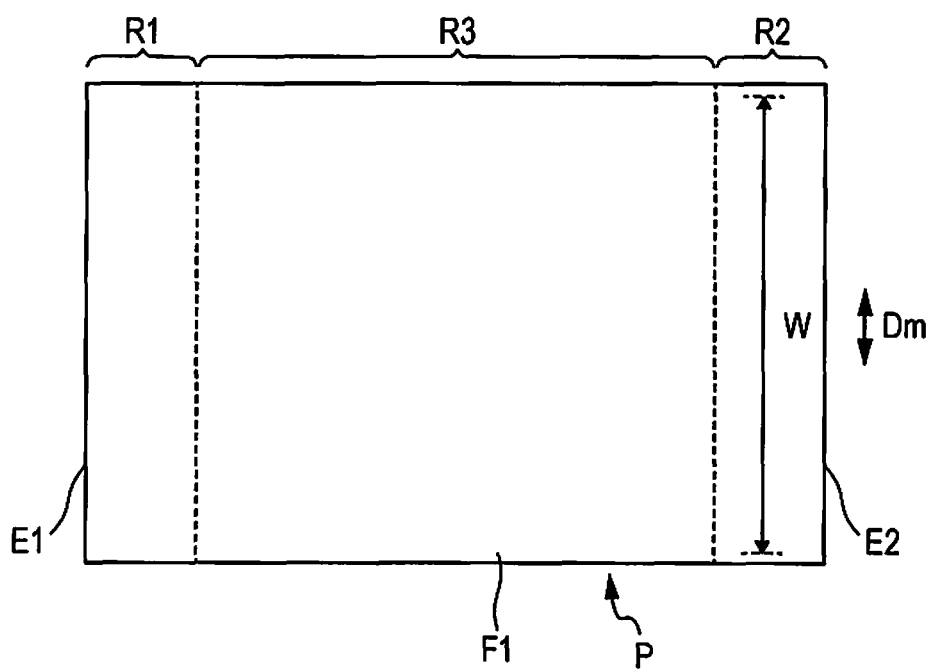

FIGS. 3A and 3B are examples for describing details of the paper P. One sheet of paper P is illustrated from the same viewpoint as those of FIGS. 2A to 2C in FIG. 3A and a first side F1 of this sheet of paper P is illustrated in FIG. 3B. A reference sign Dm shown in FIG. 3B is the main scanning direction of the carriage 16b. The paper P has the first side F1 and a second side F2. The first side F1 is a surface that first opposes the nozzle surface 16a1 after transported from the source of supply, such as the paper feed cassette 31, and is also referred to as a front side. When performing double-sided printing on the paper P, the second side F2 is a surface that opposes the nozzle surface 16a1 by the paper P being inverted after printing onto the first side F1 and is also referred to as a back side. In FIGS. 3A and 3B, the paper P is in a state where the first side F1 opposes the nozzle surface 16a1.

An end of the paper P facing the downstream side DS in a state where the first side F1 opposes the nozzle surface 16a1 will be referred to as a paper end E1 for convenience of description and an end of the paper P facing the upstream side US in this state will be referred to as a paper end E2 for convenience of description. The downstream side DS is the "front" and the upstream side US is the "rear" for the paper P transported from the upstream side US toward the downstream side DS. Therefore, the paper end E1 may also be referred to as a front end (or a leading end) of the first side F1 and the paper end E2 may also be referred to as a rear end of the first side F1. In a state where the second side F2 opposes the nozzle surface 16a1, the paper end E1 faces the upstream side US and the paper end E2 faces the downstream side DS. Therefore, the paper end E2 may also be referred to as a front end (or a leading end) of the second side F2 and the paper end E1 may also be referred to as a rear end of the second side F2.

Reference signs R1 and R2 of FIGS. 3A and 3B indicate end portions of the first side F1 of the paper P in the transporting direction Df. In other words, the end portion R1 is a predetermined region on a front end side of the first side F1 and the end portion R2 is a predetermined region at the rear end of the first side F1. A reference sign R3 indicates a middle portion of the first side F1. The middle portion R3 is a region excluding the end portions R1 and R2 from the first side F1.

A state where the printing onto the first side F1 of the paper P is terminated is illustrated in FIG. 2A. In such a state, the paper end E2 is on the downstream side DS of the PF roller 25 and is at a position almost corresponding to a position of the print head 16*a* on the most downstream side DS. In a case where double-sided printing is set as a printing condition, the control unit 11 controls the transporting unit 17 from the state illustrated in FIG. 2A to start transporting (back-feed) of the paper P in response to reverse rotation of the rollers 25 and 26 and to send the paper P to the upstream side US. Evidently, in a case where double-sided printing is not set as a printing condition (single-sided printing is set), the control unit 11 causes the rollers 25 and 26 to continuously forward-rotate and causes the paper P, on which the printing onto the first side F1 is terminated, to be output from the output port 32 without causing the transporting unit 17 to execute such back-feed.

At timing when the paper end E2 of the paper P has come to the upstream side US of the PF roller 25 due to the back-feed, the transporting unit 17 can temporarily cease this back-feed. In FIG. 2B, a state where such back-feed is temporarily stopped is illustrated. By temporarily stopping the back-feed, time to naturally dry the paper P, on which printing of the first side F1 is terminated, can be secured. As illustrated in FIG. 2B, the position of the paper P, which is at a position in a state of being nipped between the PF roller 25 and the following roller 25*a* and being nipped between the EJ roller 26 and the following roller 26*a* as a result of temporarily stopping the back-feed, is also called as a first stop position. In addition, time for which the paper P remains stopped at the first stop position is called as first drying time.

After the elapse of the first drying time from the time when the paper P is stopped at the first stop position, the transporting unit 17 resumes the back-feed of the paper P. The paper end E2 of the paper P, which further proceeds to the upstream side US due to the resumption of the back-feed, enters the transport path for inversion 41. The transport path for inversion 41 links a predetermined point between the intermediate roller 23 and the PF roller 25 on the transport path 40 to a predetermined point between the PU roller 24 and the intermediate roller 23 on the transport path 40. By continuing the back-feed, the paper P proceeds to the transport path for inversion 41 and gets on the transport path 40 in due time with the paper end E2 at the head. The paper P entered the transport path 40 in such a manner is transported through the transport path 40 again in response to the rotation of the intermediate roller 23.

The transporting unit 17 can temporarily cease the back-feed and the rotation of the intermediate roller 23 at timing when the paper end E2 of the paper P that entered the transport path 40 via the transport path for inversion 41 passes through a predetermined following roller (for example, the following roller 23*b* on the downstream side out of the following rollers 23*a* and 23*b*) corresponding to the intermediate roller 23. In FIG. 2C, a state where the back-feed and the rotation of the intermediate roller 23 are temporarily stopped in such a manner is illustrated. Accordingly, time to naturally dry the paper P, on which printing of the first side F1 is terminated, can be further secured. As illustrated in FIG. 2C, the position of the paper P which is in a state where the vicinity of the paper end E2 is nipped between the intermediate roller 23 and a predetermined following roller (for example, the following roller 23*b*) is also called as a second stop position. In addition, time for which the paper P remains stopped at the second stop position is called as second drying time.

After the elapse of the second drying time from the time when the paper P is stopped at the second stop position, the transporting unit 17 resumes transporting of the paper P on the transport path 40 in response to the rotation of the intermediate roller 23. The transporting unit 17 terminates the back-feed at a time point when the paper end E1 of the paper P passes through the PF roller 25 to the upstream side US due to the back-feed. The paper P that proceeds with the paper end E2 at the head, in other words, the inverted paper P is transported to the downstream side DS in response to the rotation (forward rotation) of the rollers 25 and 26 in a state of being pinched between the PF roller 25 and the following roller 25*a* and/or being pinched between the EJ roller 26 and the following roller 26*a* in due time and the second side F2 opposes the nozzle surface 16*a*1. Evidently, inks are discharged by the print head 16*a* onto the second side F2, in other words, printing is performed. Then, the transporting unit 17 outputs the paper P, on which printing onto the second side F2 is terminated, from the output port 32 in response to the continuous forward rotation of the rollers 25 and 26.

The transporting of the paper P performed by the transporting unit 17 after the printing onto the first side F1 before the start of the printing onto the second side F2 as in the above description is called as transporting for inversion. In addition, processing of temporarily stopping the transporting at the first stop position and the second stop position in the process of the transporting for inversion is called as drying processing.

Inks are discharged onto the first side F1 of the paper P and the paper P is likely to swell out and curl due to the moisture of the inks. At this time, the first side F1 curls (in a convex shape) so as to rise upward. Drying of the paper P at the first stop position described above has an effect of straightening such curl. In addition, drying the paper P at the first stop position can prevent the inks attached to the first side F1 from being transferred to the intermediate roller 23 when the first side F1 of the paper P comes into contact with the intermediate roller 23 after then.

In addition, drying of the paper P at the second stop position described above has an effect of flattening (uncurling) the paper P in the end by curling the paper P in a direction opposite to the direction of the curl. In other words, curling the paper P along a curved surface of the intermediate roller 23 as illustrated in FIG. 2C can offset the curl of the paper P generated by discharging the inks onto the first side F1. In particular, since the vicinity (end portion R2) of the paper end E2 of the paper P is a last part to be printed at a time of printing onto the first side F1, the end portion R2 is the least dried part on the first side F1 and the degree of curl is relatively high. By uncurling a certain area of the paper P, including the vicinity of the paper end E2 of which the degree of curl is high as in the above description, at the second stop position by means of the curved surface of the intermediate roller 23, the warp of the paper P, in other words, the curl can be precisely removed.

As described above, the drying processing includes processing of stopping the transporting for inversion of the paper P at the first stop position for the first drying time and processing of stopping the transporting for inversion at the second stop position for the second drying time. For this reason, drying time T (refer to FIGS. 6 and 11) for the drying processing, which is determined as described later, basically refers to the sum of the first drying time and the second drying time. The breakdown of the drying time T, including the first drying time and the second drying time, is not particularly limited in the embodiment. However, the printing apparatus 10 may execute only the processing of stopping the transporting for inversion at the first stop position for the drying time T as drying processing. In this case, drying time T=first drying time is satisfied. On the contrary, the printing apparatus 10 may execute only the processing of stopping the transporting for inversion at the second stop position for the drying time T as drying processing. In this case, drying time T=second drying time is satisfied.

Hereinafter, several examples related to double-sided printing which is realized under the control of the control unit 11 will be described.

2. First Example

Figure 4:
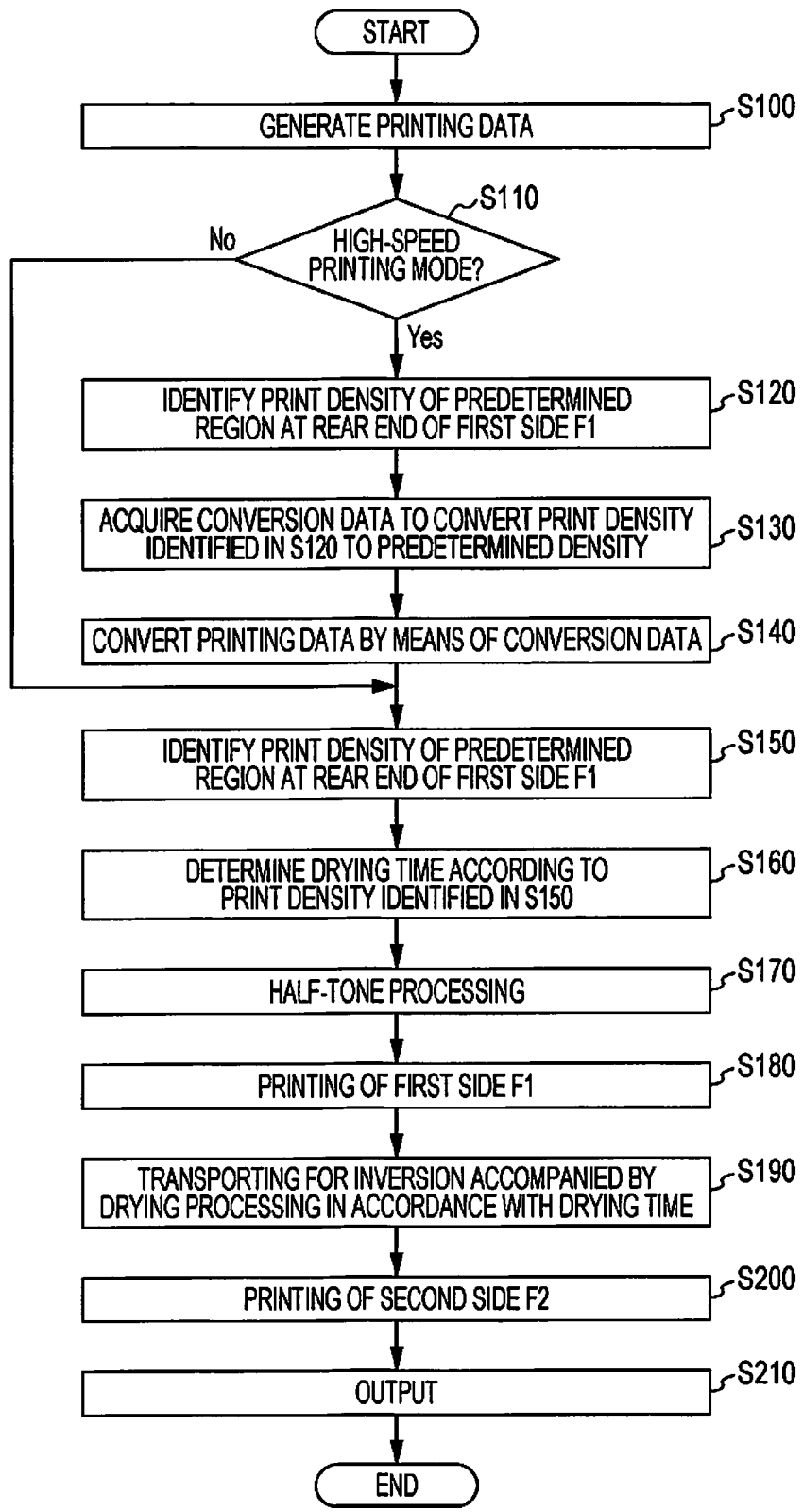
FIG. 4 is a flowchart illustrating processing regarding double-sided printing of first to third examples.

FIG. 4 is a flowchart of processing regarding double-sided printing. As an assumption of describing the flowchart, it is assumed that double-sided printing is set as one of printing conditions. The printing apparatus 10 can set printing conditions to be adopted, for example, by the user operating the operational input unit 12 or the external device 100 in advance and designating via a predetermined user interface (UI screen).

The control unit 11 generates printing data indicating an image, which is a printing target (Step S100). The control unit 11 first acquires input data indicating an image (image that includes various objects such as a picture, a CG, and a character), which is a printing target designated at the user's discretion who operates the operational input unit 12 or the external device 100, from the external device 100 or the storage medium within the printing apparatus 10. Although there are a variety of input data formats, the input data is, for example, bitmap data having shade values of red (R), green (G), and blue (B) for each pixel. The control unit 11 generates the printing data by carrying out imaging processing such as resolution conversion processing or color (color system) conversion processing with respect to the input data.

In the color conversion processing, the control unit 11 converts data with reference to a color conversion lookup table (LUT) specifying a conversion relationship between a RGB color system and a color system (CMYK color system) of inks used by the printing apparatus 10. The color conversion LUT is a LUT generated in advance considering various elements regarding image quality including color reproducibility, granularity, a so-called duty limit value, and color constancy of the printing apparatus 10. As a result of such color conversion processing, the control unit 11 can obtain printing data having a shade value (for example, 256 shades of 0 to 255) indicating the density of each of CMYK inks for each pixel. Such a shade value of each of the CMYK inks may be indicated as the amount of each of the CMYK inks. As a matter of course, the control unit 11 sequentially generates printing data (printing data for the first side) indicating an image to be printed onto the first side F1 and printing data (printing data for the second side) indicating an image to be printed onto the second side F2.

Next, the control unit 11 divides processing according to whether or not a high-speed printing mode is currently designated (Step S110). If the high-speed printing mode is designated, it is determined to be "Yes" in Step S110 and processing proceeds to Step S120. If the high-speed printing mode is not designated, it is determined to be "No" in Step S110 and processing proceeds to Step S150. The high-speed printing mode is one of a plurality of printing modes, which may be selected at the user's discretion, and is a mode in which a printing speed takes precedence. For example, the user can designate any one of double-sided printing and single-sided printing and designate a mode at the user's discretion out of the plurality of printing mode such as a "high image quality printing (clear) mode", a "normal printing (usual) mode", and the "high-speed printing (fast) mode", which are associated with image quality or a printing speed, via the UI screen by operating the operational input unit 12 or the external device 100 in advance. If the control unit 11 receives such designation of the high-speed printing mode, it is determined to be "Yes" in Step S110 and processing proceeds to Step S120. The term of high-speed printing mode is merely a generic name of a printing mode. In Step S110, it may be determined that whether or not a specific mode, in which the printing speed relatively takes precedence, is designated in the end out of the plurality of printing modes, which may be selected at the user's discretion, and then processing may be divided.

In Step S120, the control unit 11 identifies the print density of a predetermined region (end portion R2) at the rear end of the first side F1 based on the printing data generated in Step S100. Hereinafter, the printing data (printing data for the first side and printing data for the second side) generated in Step S100 will also be called as printing data before conversion for convenience of description.

Figure 5:
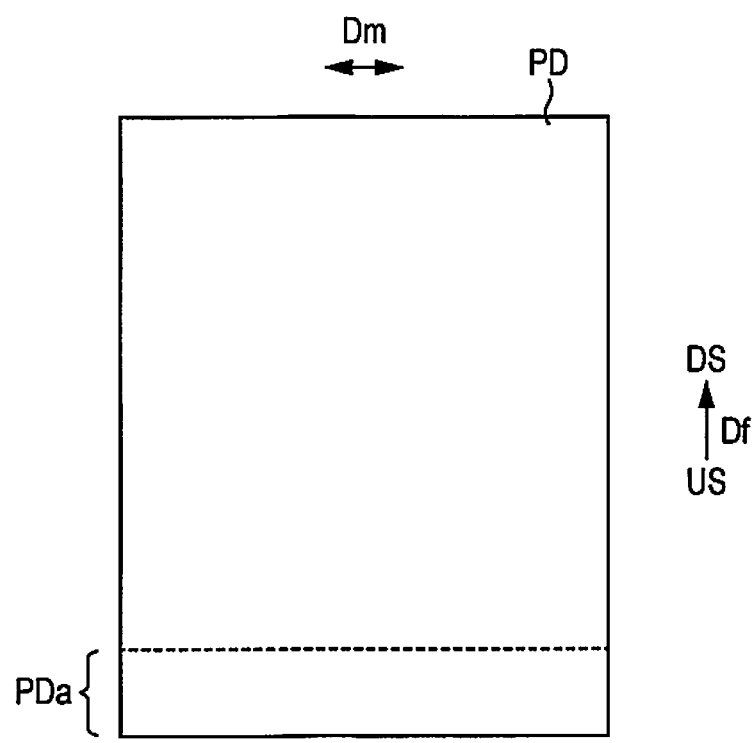
FIG. 5 is a view illustrating printing data for a first side including printing data corresponding to a rear end portion.

FIG. 5 illustrates printing data for the first side PD. A predetermined area corresponding to the upstream side US in the printing data for the first side PD is printing data corresponding to a rear end portion PDa. The printing data corresponding to the rear end portion PDa is data indicating an image to be printed onto the end portion R2 of the first side F1. The positions and the sizes of the end portions R1 and R2 on the paper P are fixed for each size of the paper P. The size of the paper P is also set as one of the printing conditions (for example, the size of the paper P is set to A4). Since the control unit 11 generates the printing data for the first side and the printing data for the second side in accordance with the size of the paper P, the area of the printing data corresponding to the rear end portion PDa is naturally determined based on a predetermined disposition (disposition in which the edges of the paper P having predetermined horizontal and vertical widths are considered) of the printing data for the first side PD on the first side F1 of the paper P.

The control unit 11 first acquires a total ink amount Isum to be discharged to the end portion R2 from the printing data corresponding to the rear end portion PDa to obtain the print density of the end portion R2. Specifically, a value obtained by adding up a total (C+M+Y+K) of shade values of all ink colors in the unit of pixel within the printing data corresponding to the rear end portion PDa for all pixels included in the printing data corresponding to the rear end portion PDa is set as the total ink amount Isum. Next, the control unit 11 obtains Isum/W by dividing the total ink amount Isum by a printing region width W. As illustrated in FIG. 3B, the printing region width W is a length in a main scanning direction Dm. Specifically, the printing region width W is a value obtained by subtracting the sum of the widths of the edges on both sides in the main scanning direction Dm from a paper width in the main scanning direction Dm, which is the size of the set paper P. Alternatively, the printing region width W may be the number of pixels of the printing data for the first side PD in the main scanning direction Dm. In any case, Isum/W refers to the amount of inks discharged to the end portion R2 of the first side F1 per unit distance (1 mm or a distance for one pixel) and this amount is an example of the print density of the end portion R2. Hereinafter, the print density Isum/W of the end portion R2 will also be indicated by a print density X.

In Step S130, the control unit 11 acquires conversion data to make the print density X of the end portion R2 identified in Step S120 equal to or lower than a predetermined density.

FIG. 6 is an example of a drying time table 50. The control unit 11 stores such a table in advance and can appropriately refer to the table in Step S130 or when determining the drying time T for drying processing (Step S160 which will be described later). A correlation relationship between the print density X and the drying time T is defined in the drying time table 50. Basically, as the print density X becomes higher, a longer drying time T is correlated. As described above, the end portion R2 is a last part to be printed on the first side F1 and is a first part to be printed on the back side when the second side F2 is printed. Therefore, the drying time T may be referred to as time needed for drying the inks discharged on the end portion R2 and straightening the curl in the vicinity of the end portion R2. For this reason, in the drying time table 50, the drying time T is specified according to the print density X.

In FIG. 6, X1, X2, X3, . . . are threshold values related to the print density X and have a relationship of X1<X2<X3. In addition, in FIG. 6, T1, T2, T3, . . . are choices of the drying time T and has a relationship of T1<T2<T3. In an example of FIG. 6, the drying time T is T1 (sec) in a case where the print density X is equal to or lower than the threshold value X1, the drying time T is T2 (sec) in a case where the print density X is higher than the threshold value X1 and is equal to or lower than the threshold value X2, and the drying time T is T3 (sec) in a case where the print density X is higher than the threshold value X2 and is equal to or lower than the threshold value X3. T1 is set to 0. In other words, the case where the print density X is equal to or lower than the threshold value X1 means that curl which needs the drying time T is not generated in the vicinity of the end portion R2.

In the embodiment, the control unit 11 obtains a conversion coefficient X1/X as the conversion data. In other words, the threshold value X1 is the predetermined density. The threshold value X1 is an upper limit of the print density X in a case where the drying time T is T1, which is the shortest. Therefore, in Step S130, it can be said that the control unit 11 acquires a conversion coefficient to convert the print density X to a density (threshold value X1) at which the drying time T is T1, which is the shortest. In addition, as described above, T1 is set to 0. For this reason, in Step S130, it can be said that the control unit 11 acquires a conversion coefficient to lower the print density X to a density (threshold value X1) at which the drying time T is 0. The conversion data in the invention may be a conversion equation instead of being a form of a coefficient.

In Step S140, the control unit 11 converts the printing data (printing data before conversion) by means of the conversion data (conversion coefficient X1/X) acquired in Step S130. The target of this conversion is at least the printing data for the first side in the printing data before conversion. However, it can be said that it is unnatural if there is a difference between the density of a printing result on the first side F1 and the density of a printing result on the second side F2 of the same paper P. For this reason, the control unit 11 converts the printing data for the first side and the printing data for the second side of the printing data before conversion by means of the conversion coefficient X1/X. In this case, for example, each of shade values CMYK of all ink colors of all pixels that configure the printing data before conversion are uniformly multiplied by the conversion coefficient X1/X. Accordingly, the printing data for the first side and the printing data for the second side of the printing data before conversion are converted to data of which the density of each ink color is lowered as a whole. Hereinafter, the printing data (printing data for the first side and printing data for the second side) converted in Step S140 will also be called as printing data after conversion.

However, in a case where the conversion coefficient X1/X acquired in Step S130 is a value that is equal to or higher than 1, the control unit 11 sets the conversion coefficient to 1 and practically does not execute conversion in Step S140. In this case, the printing data before conversion and the printing data after conversion are completely the same data. In a case where the conversion coefficient X1/X acquired in Step S130 is equal to or higher than 1, dividing processing in Step S110 becomes meaningless in the end. Herein, a case where the conversion coefficient X1/X acquired in Step S130 is less than 1 will be continued to be described as an example.

Next, processing after Step S150 will be described.

As a matter of course, in a case where processing proceeds to Step S150 through Steps S120, S130, and S140, the control unit 11 executes processing after Step S150 using the printing data after conversion (printing data for the first side and printing data for the second side) as the printing data. On the other hand, in a case where processing proceeds from Step S110 to Step S150 without going through Steps S120, S130, and S140, the control unit 11 executes processing after Step S150 using the printing data before conversion (printing data for the first side and printing data for the second side) as the printing data.

In Step S150, the control unit 11 identifies the print density X of the predetermined region (end portion R2) at the rear end of the first side F1 based on the printing data. The order of identifying the print density X of the end portion R2 based on the printing data is the same as the order described in Step S120. Evidently, in a case of going through Steps S120, S130, and S140, the control unit 11 identifies the print density X of the end portion R2 in Step S150 based on the printing data for the first side in the printing data after conversion.

In Step S160, the control unit 11 determines the drying time T for drying processing according to the print density X identified in Step S150. The control unit 11 determines the drying time T corresponding to the print density X identified in Step S150 with reference to the drying time table 50 (FIG. 6). As described above, the printing data after conversion is data obtained by converting the printing data before conversion by means of the conversion coefficient X1/X obtained in Step S130. Therefore, the print density X of the end portion R2 identified based on the printing data for the first side in the printing data after conversion is a value that is equal to or lower than the threshold value X1 in Step S150. For this reason, in a case of going through Steps S120, S130, and S140, the control unit 11 determines T1, which is the shortest, as the drying time T in Step S160.

In Step S170, the control unit 11 performs half-tone processing with respect to the printing data. By performing the half-tone processing, the printing data is converted, for example, to two-value half-tone data in which ink discharging (dot-on) and ink non-discharging (dot-off) are specified for each pixel or for each of CMYK inks since printing data at a current time point is data in which the density of each of CMYK inks for each pixel is indicated in multiple shades. The half-tone processing can be performed, for example, with techniques, including a dither method and an error diffusion method, being adopted. Processing of Step S170 may be executed along with processing of Steps S150 and S160.

In Step S180, the control unit 11 executes the printing onto the first side F1 (front side printing). In other words, the control unit 11 controls the transporting unit 17 to execute transporting of the paper P and paper-feeding from the paper feed cassette 31 and to drive the carriage 16b and the print head 16a, causing the print head 16a to discharge inks based on the printing data for the first side (data obtained by performing the half-tone processing on the printing data for the first side in Step S170) in the printing data. As a result, the printing onto the first side F1 of the paper P is executed.

After the printing onto the first side F1 is terminated, the control unit 11 controls the transporting unit 17 to execute the transporting for inversion described above (Step S190). The control unit 11 causes the transporting unit 17 to execute drying processing in the process of transporting for inversion in accordance with the drying time T determined in Step S160. In other words, the transporting unit 17 dries the paper P of which the first side F1 is printed by temporarily stopping the transporting for inversion of the paper P at the first stop position and/or the second stop position for the determined drying time T. As described above, T1 is set to 0. Therefore, in a case where the determined drying time T is T1, the transporting unit 17 performs the transporting for inversion without executing the drying processing, in other words, without stopping the paper P at both of the first stop position and the second stop position.

After the transporting for inversion is terminated, the control unit 11 executes the printing onto the second side F2 (back side printing) (Step S200). In other words, the control unit 11 controls the transporting unit 17 to start paper-feeding of the inverted paper P and to drive the carriage 16b and the print head 16a, causing the print head 16a to discharge inks based on the printing data for the second side the (data obtained by performing the half-tone processing on the printing data for the second side in Step S170) in the printing data. As a result, the printing onto the second side F2 of the paper P is executed. After the printing onto the second side F2 is terminated, the control unit 11 causes the transporting unit 17 to output the paper P, on which printing is terminated, from the output port 32 (Step S210).

As in the above description, according to the embodiment, in a case of executing double-sided printing on the paper P, the printing apparatus 10 identifies the print density X of the predetermined region (end portion R2) at the rear end of the first side F1 of the paper P (Step S120), acquires the conversion data (conversion coefficient X1/X) to lower the identified print density X so as to be equal to or lower than the predetermined density (threshold value X1) (Step S130), and converts the printing data by means of the conversion data (Step S140), based on the printing data, to execute printing based on the printing data after conversion (Steps S170 to S200). The printing apparatus 10 determines the drying time T of the drying processing conducted in the process of transporting for inversion according to the print density X identified in Step S150 (Step S160). As in the embodiment, the drying time T determined according to the print density X based on the printing data after conversion becomes shorter than the drying time T determined according to the print density X based on the printing data before conversion by the density being lowered as a whole as a result of converting the printing data by means of the conversion coefficient X1/X. That is, according to the embodiment, the drying time T can be reduced by executing printing based on the printing data after conversion and total time required for double-sided printing shortens in the end, thereby improving printing efficiency.

In addition, in the embodiment, the printing apparatus 10 can receive the designation of the high-speed printing mode, in which the printing speed takes precedence, out of the plurality of printing modes. The printing apparatus 10 executes printing based on the printing data after conversion in a case where the designation of the high-speed printing mode is received (Step S110→S120 to S200) and executes printing based on the printing data before conversion in a case where the designation of the high-speed printing mode is not received (Step S110→S150 to S200). In other words, printing is executed based on the printing data after conversion in a case where the user designates the high-speed printing mode. Accordingly, a demand of the user for finishing double-sided printing in a short period of time can be precisely met.

In addition, in the embodiment, the predetermined density (threshold value X1) is a print density that does not require the drying time T (drying time T is set to T1). According to such a configuration, the drying time T determined in Step S160 is set to T1, that is, 0 and printing efficiency improves since the printing data after conversion, which has been converted by means of the conversion coefficient X1/X, becomes data in which the density has been lowered to an extent of not requiring the drying time T. However, T1, which is the shortest drying time specified in the drying time table 50 (FIG. 6), may be a certain number of seconds instead of 0. In any case, by setting the predetermined density as the threshold value X1, the drying time T determined according to the print density X based on the printing data after conversion can be set to the shortest drying time T1 specified in the drying time table 50.

3. Second Example

A second example will be described by means of the flowchart of FIG. 4. In each example after the second example, description of points that are common to points described hereinbefore will be appropriately omitted.

In the second example, based on the printing data before conversion, the control unit 11 identifies the highest print density out of print densities of split regions in a case where the predetermined region (end portion R2) at the rear end of the first side F1 is split into a plurality of regions in Step S120.

Figure 7:
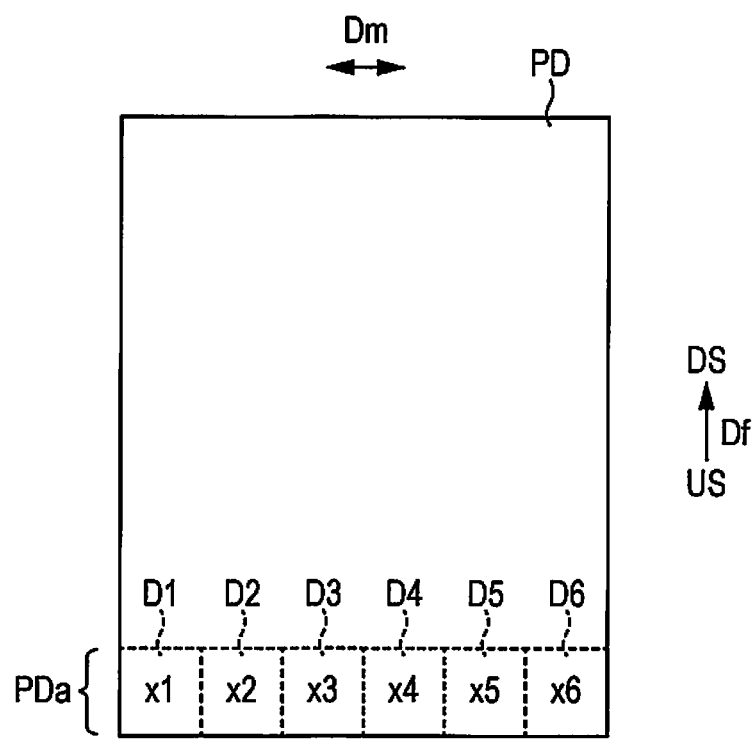
FIG. 7 is a view illustrating the printing data for the first side including split printing data corresponding to the rear end portion.

FIG. 7 illustrates the printing data for the first side PD as in FIG. 5. The control unit 11 splits the printing data corresponding to the rear end portion PDa in the printing data for the first side PD into a plurality of split data regions arranged in the main scanning direction Dm. Although the number of splits is not particularly limited, FIG. 7 illustrates an example in which the printing data corresponding to the rear end portion PDa is split into six split data regions D1, D2, D3, D4, D5, and D6. Each split data region is an equally divided region and the width (split region width) of each region in the main scanning direction Dm is one sixth of the printing region width W if the number of regions is six.

The control unit 11 acquires the print density of each of the split data regions D1, D2, D3, D4, D5, and D6. A reference sign x1 shown in FIG. 7 means the print density of the split data region D1. Similarly, a reference sign x2 indicates the print density of the split data region D2, a reference sign x3 indicates the print density of the split data region D3, a reference sign x4 indicates the print density of the split data region D4, a reference sign x5 indicates the print density of the split data region D5, and a reference sign x6 indicates the print density of the split data region D6.

Specifically, the control unit 11 sets a value obtained by adding up a total (C+M+Y+K) of shade values of all ink colors in the unit of pixel within the split data region D1 for all pixels included in the split data region D1 as a total ink amount of the split data region D1. Then, the result of dividing the total ink amount of the split data region D1 by the split region width is set as the print density x1 of the split data region D1. The control unit 11 can obtain print densities x2, x3, x4, x5, and x6 by performing the same calculation on the other split data regions D2, D3, D4, D5, and D6. Such print densities x1, x2, x3, x4, x5, and x6 are the print density of each split region in a case where the end portion R2 is split into a plurality of regions. The split region means a region within the end portion R2 corresponding to a certain split data region. The control unit 11 identifies the highest print density out of the print densities x1, x2, x3, x4, x5, and x6 and sets the identified print density as the print density of the end portion R2.

In Step S130, the control unit 11 acquires the conversion data to make the print density of the end portion R2 identified in Step S120 equal to or lower than the predetermined density. Herein, it is assumed that the print density x2 is the highest out of the print densities x1, x2, x3, x4, x5, and x6 described above. In this case, the control unit 11 obtains a conversion coefficient X1/x2 as the conversion data. In Step S140, as a matter of course, the control unit 11 converts the printing data before conversion by means of the conversion coefficient X1/x2. In other words, the printing data after conversion (printing data for the first side and printing data for the second side), in which the density of each ink color is lowered as a whole, is obtained by uniformly multiplying each of the shade values CMYK of all ink colors of all pixels that configure the printing data before conversion (printing data for the first side and printing data for the second side) by the conversion coefficient X1/x2.

In Step S150, as in the first example, the control unit 11 may identify the print density X of the end portion R2 based on the printing data (any one of the printing data after conversion and the printing data before conversion) and does not need to obtain the print density of each split region as in Step S120. In the second example, since the conversion coefficient acquired in Step S130 is a coefficient to make the print density of the split region, of which the print density is the highest out of the plurality of split regions within the end portion R2, the predetermined density (threshold value X1), the print density X of the end portion R2 calculated based on the printing data (printing data after conversion) converted by such a conversion coefficient becomes, without fail, equal to or lower than the predetermined density (threshold value X1) in Step S150 after going through Steps S120, S130, and S140.

In a case (first case) where inks are evenly discharged almost without bias to the end portion R2 of the first side F1 and in a case (second case) where a large amount of inks are locally discharged to the end portion R2 of the first side F1, it can be said that large curl is likely to be generated in the end portion R2 in the second case due to the local ink amount even when total ink amounts discharged to the end portion R2 are the same. Since the print density X of the end portion R2 identified in Step S120 of the first example is an average value of the entire end portion R2 (entire printing data corresponding to the rear end portion PDa), a locally-large ink amount as in the second case cannot be found out. In view of such problems, in the second example, the printing data before conversion is converted by means of the conversion data to make the highest print density, out of the print densities (for example, the print densities x1, x2, x3, x4, x5, and x6) of the split regions in a case where the end portion R2 is split into the plurality of regions, equal to or lower than the predetermined density (threshold value X1). Therefore, when printing is performed onto the first side F1 of the paper P based on the printing data for the first side of the printing data after conversion, curl (curl which needs the drying time T) caused by a local ink amount in the end portion R2 is not generated in the end portion R2 and the drying time T can be reduced (for example, reduced to 0).

4. Third Example

A third example is based on the second example. Based on the printing data before conversion, the control unit 11 identifies the highest print density out of the print densities of the split regions in a case where the predetermined region (end portion R2) at the rear end of the first side F1 is split into the plurality of regions in Step S120. However, the control unit 11 weights the print density of each split region and identifies the highest print density out of the print densities of the weighted split regions.

Figure 8:
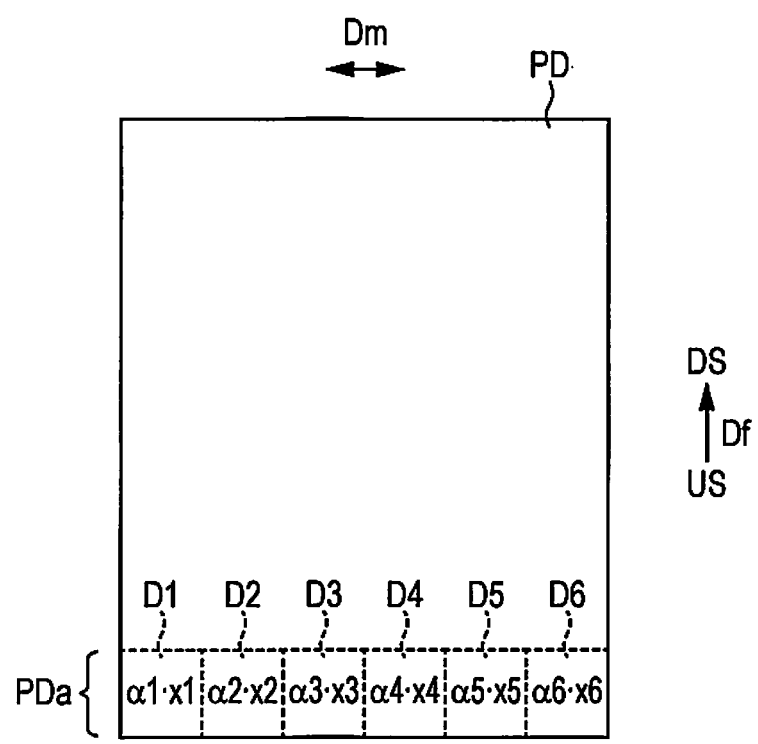
FIG. 8 is a view illustrating weights of split regions of the printing data corresponding to the rear end portion.

FIG. 8 illustrates the printing data for the first side PD as in FIG. 7. The meanings of reference signs that are common to FIG. 7 are the same as described in relation to FIG. 7. $\alpha 1$, $\alpha 2$, $\alpha 3$, $\alpha 4$, $\alpha 5$, and $\alpha 6$ are the weights. The weight $\alpha 1$ is a weight corresponding to the split data region D1 and the control unit 11 multiplies the print density x1 of the split data region D1 by the weight $\alpha 1$. Similarly, the weight $\alpha 2$ is a weight corresponding to the split data region D2 and the control unit 11 multiplies the print density x2 of the split data region D2 by the weight $\alpha 2$. Similarly, each of the other weights $\alpha 3$, $\alpha 4$, $\alpha 5$, and $\alpha 6$ are multiplied by the corresponding print densities x3, x4, x5, and x6 of the split data regions D3, D4, D5, and D6.

The control unit 11 gives a higher weight to a print density, among the print densities x1, x2, x3, x4, x5, and x6, corresponding to a region farther from the center of the paper P. To put it differently, a higher weight is given to a print density corresponding to a region closer to ends in the main scanning direction Dm. In an example of FIG. 8, since the split data regions D1 and D6 are regions that are the farthest from the center of the paper P in a positional relationship with the paper P, out of the split data regions D1, D2, D3, D4, D5, and D6, the weight $\alpha 1$ given to the print density x1 of the split data region D1 and the weight $\alpha 6$ given to the print density x6 of the split data region D6 are the highest values. On the contrary, since the split data regions D3 and D4 are regions that are the closest to the center of the paper P in a positional relationship with the paper P, out of the split data regions D1, D2, D3, D4, D5, and D6, the weight $\alpha 3$ given to the print density x3 of the split data region D3 and the weight $\alpha 4$ given to the print density x4 of the split data region D4 are the lowest values.

In other words, a relationship of $\alpha 3 = \alpha 4 < \alpha 2 = \alpha 5 < \alpha 1 = \alpha 6$ is established. The control unit 11 identifies the highest print density out of the weighted print densities $\alpha 1 \cdot x1$, $\alpha 2 \cdot x2$, $\alpha 3 \cdot x3$, $\alpha 4 \cdot x4$, $\alpha 5 \cdot x5$, and $\alpha 6 \cdot x6$ and sets the identified print density as the print density of the end portion R2. In Step S130, the control unit 11 acquires the conversion data to make the print density of the end portion R2 identified in Step S120 equal to or lower than the predetermined density. Herein, it is assumed that the print density $\alpha 1 \cdot x1$ is the highest out of the print densities $\alpha 1 \cdot x1$, $\alpha 2 \cdot x2$, $\alpha 3 \cdot x3$, $\alpha 4 \cdot x4$, $\alpha 5 \cdot x5$, and $\alpha 6 \cdot x6$ described above. In this case, the control unit 11 obtains a conversion coefficient $X1/(\alpha 1 \cdot x1)$ as the conversion data. In Step S140, the control unit 11 converts the printing data before conversion by means of the conversion coefficient $X1/(\alpha 1 \cdot x1)$.

When inks are discharged onto the paper P, the paper P has a characteristic in which a region closer to the ends is likely to curl. Within the end portion R2 of the paper P, the split regions (region corresponding to the split data regions D1 and D6) closer to the ends in the main scanning direction Dm are more likely to curl with a small amount of inks than the split regions (regions corresponding to the split data regions D3 and D4) closer to the middle. In the third example, by giving a weight reflecting a difference in likelihood of curl being generated in such an end portion R2 to the print density (for example, the print densities x1, x2, x3, x4, x5, and x6) of each split region in a case where the end portion R2 is split into the plurality of regions, the print density of a split region, in which curl is likely to be generated, is easily identified as the highest print density for acquiring the conversion coefficient. According to this configuration, when printing is performed on the first side F1 of the paper P based on the printing data for the first side of the printing data after conversion, curl that is likely to be generated at positions close to the ends in the main scanning direction Dm in the end portion R2 is precisely inhibited from being generated and the drying time T can be reduced (for example, reduced to 0).

5. Fourth Example

Figure 9:
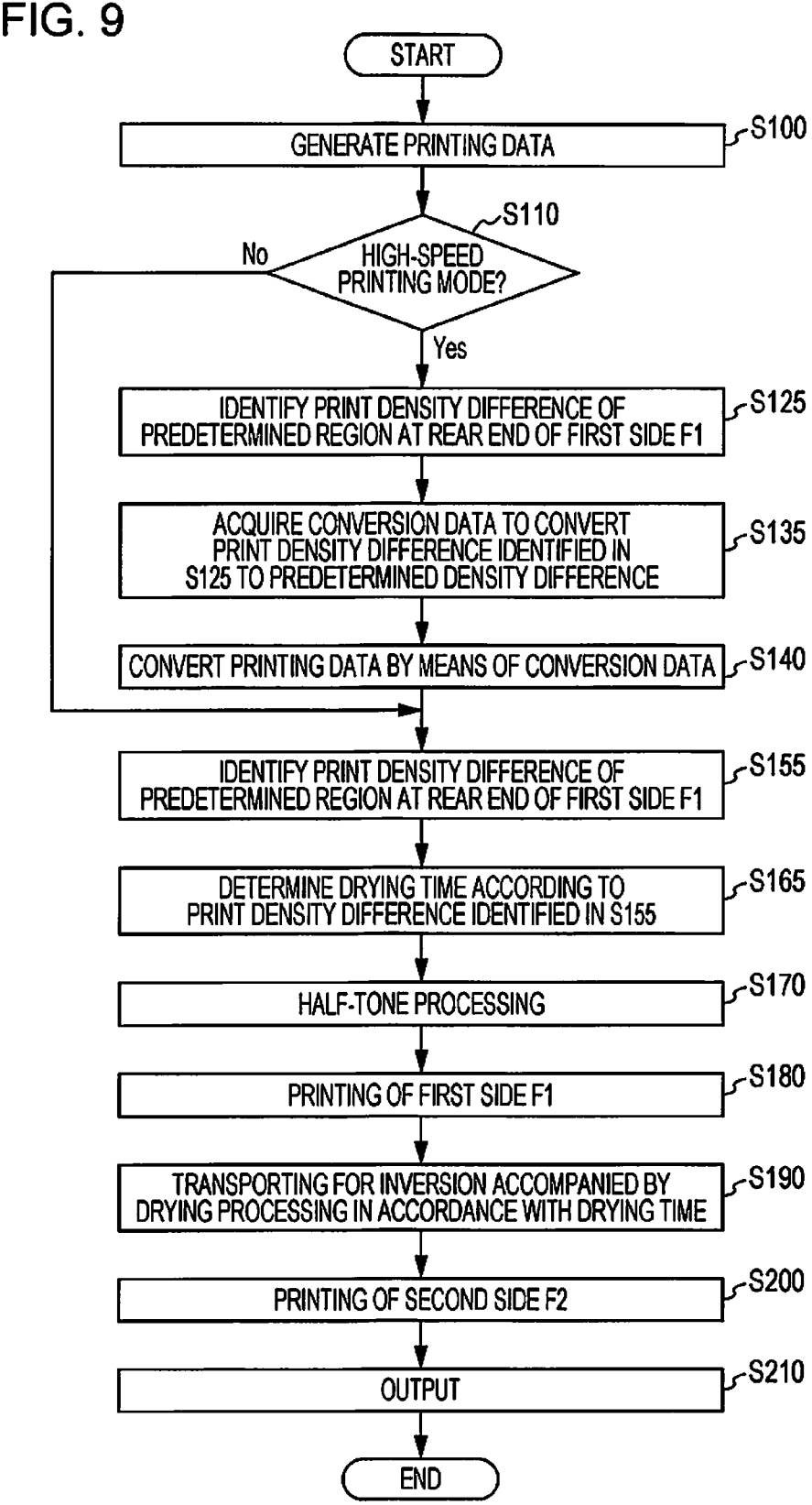
FIG. 9 is a flowchart illustrating processing regarding double-sided printing of a fourth example.

A fourth example will be described by means of a flowchart of FIG. 9. The flowchart of FIG. 9 is different from the flowchart of FIG. 4 in that the flowchart of FIG. 9 has Steps S125, S135, S155, and S165 instead of Steps S120, S130, S150, and S160.

In Step S110, if currently the high-speed printing mode is designated, the control unit 11 determines that is "Yes" and processing proceeds to Step S125 and if the high-speed printing mode is not designated, the control unit 11 determines that it is "No" and processing proceeds to Step S155.

Based on the printing data before conversion, the control unit 11 identifies a print density difference in the predetermined region (end portion R2) at the rear end of the first side F1 in Step S125. In this case, as in the second and third examples, the control unit 11 calculates the print density of each split region, for example, the print densities x1, x2, x3, x4, x5, and x6 of the split data regions D1, D2, D3, D4, D5, and D6 described above, in a case where the end portion R2 is split into the plurality of regions. Then, out of these print densities of the regions, an absolute value (print density difference) of a difference in two print densities corresponding to adjacent regions is acquired.

Figure 10:
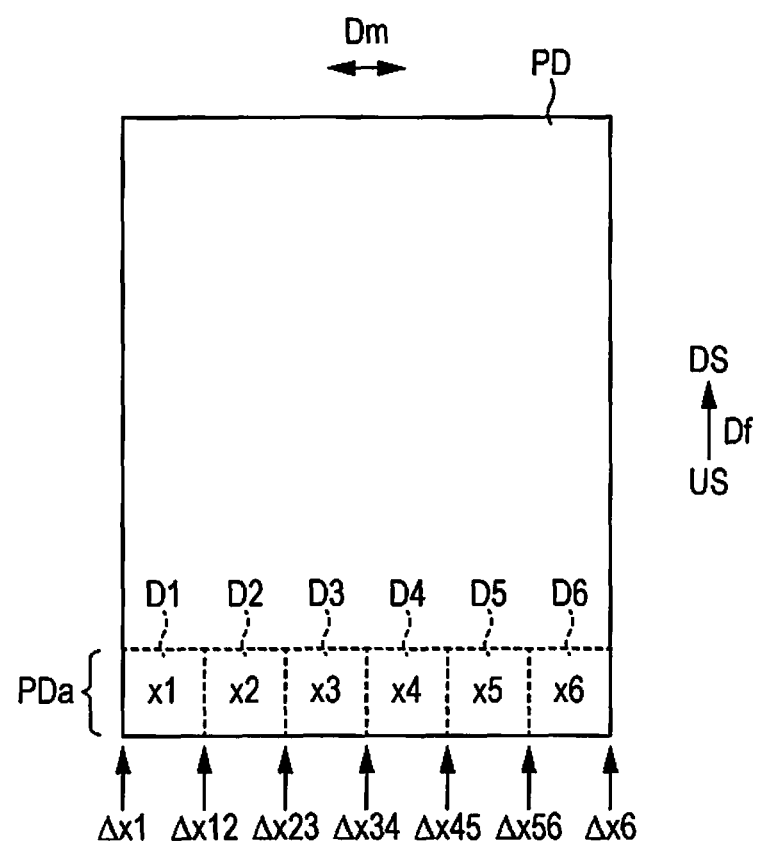
FIG. 10 is a view illustrating a print density difference between the split regions of the printing data corresponding to the rear end portion.

FIG. 10 illustrates the printing data for the first side PD as in FIGS. 7 and 8. The meanings of reference signs that are common to FIGS. 7 and 8 are the same as described in relation to FIGS. 7 and 8. In addition, each of Δx1, Δx12, Δx23, Δx34, Δx45, Δx56, and Δx6 shown in FIG. 10 mean a print density difference between adjacent regions. In other words, Δx1=x1−0
Δx12=|x1−x2|
Δx23=|x2−x3|
Δx34=|x3−x4|
Δx45=|x4−x5|
Δx56=|x5−x6|
Δx6=x6−0 are satisfied. The control unit 11 identifies the highest value out of such print density differences Δx1, Δx12, Δx23, Δx34, Δx45, Δx56, and Δx6 as a print density difference Z in the end portion R2.

In Step S135, the control unit 11 acquires conversion data to make the print density difference Z of the end portion R2 identified in Step S125 equal to or lower than a predetermined print density difference Z1, which is determined in advance. Curl is more likely to be generated in the end portion R2 in a case where there is a variation in the distribution of inks, such as a large amount of inks are locally discharged or a small amount of inks are locally discharged to the end portion R2 of the first side F1, than in a case where inks are evenly discharged almost without bias to the end portion R2 of the first side F1. From such a point of view, in the embodiment, the predetermined print density difference Z1 is determined as a threshold value which corresponds to an upper limit of the print density difference at which curl is not generated in the end portion R2. More specifically, the predetermined print density difference Z1 is the highest value of the print density difference Z at which curl which needs the drying time T is not generated in the end portion R2. In Step S135, the control unit 11 obtains a conversion coefficient Z1/Z as the conversion data.

In Step S140, the control unit 11 converts the printing data (printing data before conversion) by means of the conversion data (conversion coefficient Z1/Z) acquired in Step S135. In other words, by uniformly multiplying each of the shade values CMYK of all ink colors of all pixels that configure the printing data before conversion (printing data for the first side and printing data for the second side) by the conversion coefficient Z1/Z, the printing data after conversion (printing data for the first side and printing data for the second side), in which the density of each ink color is lowered as a whole, is obtained. However, in a case where the conversion coefficient Z1/Z acquired in Step S135 is a value that is equal to or higher than 1, as in the first to third examples, the conversion coefficient is set to 1 and conversion is practically not executed in Step S140.

Next, processing after Step S155 will be described.

As a matter of course, in a case where processing proceeds to Step S155 by going through Steps S125, S135, and S140, the control unit 11 executes processing after Step S155 using the printing data after conversion (printing data for the first side and printing data for the second side) as the printing data. On the other hand, in a case where processing proceeds from Step S110 to Step S155 without going through Steps S125, S135, and S140, the control unit 11 executes processing after Step S155 using the printing data before conversion (printing data for the first side and printing data for the second side) as the printing data.

In Step S155, based on the printing data, the control unit 11 identifies the print density difference Z in the predetermined region (end portion R2) at the rear end of the first side F1. The order of identifying the print density difference Z in the end portion R2 based on the printing data is the same as the order described in Step S125. Evidently, in a case of going through Steps S125, S135, and S140, the control unit 11 identifies the print density difference Z in the end portion R2 in Step S155 based on the printing data for the first side in the printing data after conversion.

In Step S165, the control unit 11 determines the drying time T for the drying processing according to the print density difference Z identified in Step S155. The control unit 11 determines the drying time T corresponding to the print density difference Z identified in Step S155 with reference to a drying time table 51 (FIG. 11).

FIG. 11 illustrates an example of the drying time table 51. The control unit 11 stores such a table in advance and can appropriately refer to the table in Step S135 and Step S165. A correlation relationship between the print density difference Z and the drying time T is defined in the drying time table 51. Basically, as the print density difference Z becomes higher, a longer drying time T is correlated.

In FIG. 11, Z1, Z2, Z3, . . . are threshold values related to the print density difference Z and have a relationship of Z1<Z2<Z3. The threshold value Z1 is the predetermined print density difference Z1 described above. In FIG. 11, T4, T5, T6, . . . are choices of the drying time T and have a relationship of T4<T5<T6. In the fourth example, the drying time T is T4 (sec) in a case where the print density difference Z is equal to or lower than the threshold value Z1, the drying time T is T5 (sec) in a case where the print density difference Z is higher than the threshold value Z1 and is equal to or lower than the threshold value Z2, and the drying time T is T6 (sec) in a case where the print density difference Z is higher than the threshold value Z2 and is equal to or lower than the threshold value Z3. T4 is set to 0. In other words, in a case where the print density difference Z is equal to or lower than the threshold value Z1, the drying time T is determined as 0 since curl which needs the drying time T is not generated in the vicinity of the end portion R2. As described above, the printing data after conversion is data obtained by converting the printing data before conversion by means of the conversion coefficient Z1/Z acquired in Step S135. Therefore, in Step S155, the print density difference Z of the end portion R2 identified based on the printing data for the first side in the printing data after conversion is a value that is equal to or lower than the threshold value Z1. For this reason, in a case of going through Steps S125, S135, and S140, the control unit 11 determines T4, which is the shortest, as the drying time T in Step S165.

As in the above description, according to the fourth example, in a case of executing double-sided printing on the paper P, the printing apparatus 10 identifies the print density difference Z in the predetermined region (end portion R2) at the rear end of the first side F1 of the paper P (Step S125), acquires the conversion data (conversion coefficient Z1/Z) to make the identified print density difference Z equal to or lower than the predetermined density difference (threshold value Z1) (Step S135), and converts the printing data by means of the conversion data (Step S140), based on the printing data, to execute printing based on the printing data after conversion (Steps S170 to S200). The printing apparatus 10 determines the drying time T of the drying processing conducted in the process of transporting for inversion according to the print density difference Z identified in Step S155 (Step S165). As described above, by the density and the variation in density of the printing data being lowered by going through conversion by means of the conversion coefficient Z1/Z, the drying time T determined according to the print density difference Z based on the printing data after conversion is shorter than the drying time T determined according to the print density difference Z based on the printing data before conversion. The drying time T determined according to the print density difference Z based on the printing data after conversion is basically T4, in other words, 0. That is, according to the fourth example, by executing printing based on the printing data after conversion, the drying time T can be reduced and total time required for double-sided printing shortens in the end, thereby improving printing efficiency.

6. Other Description

Hereinbefore, a so-called serial printer that causes the print head 16a to scan in the main scanning direction Dm and executes printing has been described as an example of the printing apparatus 10. However, the printing apparatus 10 may be a so-called line printer that has a fixed line head. When it is assumed that the printing apparatus 10 is a line printer, the carriage 16b is not needed in the print unit 16. In addition, the print head 16a, which is the line head, has a nozzle line having a length obtained by arranging a plurality of nozzles over the width of the paper P in a direction which corresponds to the main scanning direction Dm.

What is claimed is:

1. A printing apparatus that is capable of executing, based on printing data, printing onto a first side of a printing medium and printing onto a second side, which is the back side of the first side, after the printing onto the first side, the apparatus executing:
   identifying processing, in which a print density of a predetermined region at a rear end of the printing medium in a transporting direction at a time of printing of the first side is identified based on the printing data;
   acquiring processing, in which conversion data, which is a conversion coefficient to make the identified print density equal to or lower than a predetermined density, is acquired;
   conversion processing, in which the printing data is converted by means of the conversion data; and
   printing processing, in which printing is performed onto the first side based on the converted printing data.

2. The printing apparatus according to claim 1,
   wherein receiving designation of a high-speed printing mode, in which a printing speed takes precedence, out of a plurality of printing modes is possible, and
   in a case where the designation of the high-speed printing mode is received, the identifying processing, the acquiring processing, and the conversion processing are executed and the printing processing is executed based on the converted printing data and in a case where the designation of the high-speed printing mode is not received, the printing processing is executed based on the printing data without the identifying processing, the acquiring processing, and the conversion processing being executed.

3. The printing apparatus according to claim 1,
   wherein the predetermined density in the acquiring processing is a print density that does not need drying time of the printing medium provided before the printing onto the second side is started, which is after the printing onto the first side.

4. The printing apparatus according to claim 1,
   wherein the highest print density is identified out of print densities of split regions in a case where the predetermined region is split into a plurality of regions in the identifying processing and conversion data to make the identified highest print density equal to or lower than the predetermined density is acquired in the acquiring processing.

5. The printing apparatus according to claim 4,
   wherein, in the identifying processing, the print densities of the split regions are weighted such that a higher weight is given to print densities of split regions farther from the center of the printing medium and the highest print density is identified out of the weighted print densities of the split regions.

6. The printing apparatus according to claim 1,
   wherein the printing medium is inverted after the printing onto the first side of the printing medium and the printing onto the second side is performed with the rear end in the transporting direction at a time of the printing onto the first side as a leading end in the transporting direction at a time of the printing onto the second side.

7. A printing apparatus that is capable of executing, based on printing data, printing onto a first side of a printing medium and printing onto a second side, which is the back side of the first side, after the printing onto the first side, the apparatus executing:

identifying processing, in which a print density difference of a plurality of places within a predetermined region at a rear end of the printing medium in a transporting direction at a time of printing of the first side is identified based on the printing data;

acquiring processing, in which conversion data, which is a conversion coefficient to make the identified print density difference equal to or lower than a predetermined density difference, is acquired;

conversion processing, in which the printing data is converted by means of the conversion data; and printing processing, in which printing is performed onto the first side based on the converted printing data.

* * * * *